United States Patent [19]

Firth, Jr.

[11] Patent Number: 4,889,645

[45] Date of Patent: Dec. 26, 1989

[54] SUBSTITUTED-AMMONIUM HUMATE FLUID LOSS CONTROL AGENTS FOR OIL-BASED DRILLING MUDS

[75] Inventor: William C. Firth, Jr., Robbinsville, N.J.

[73] Assignee: Union Camp Corporation, Wayne, N.J.

[21] Appl. No.: 699,845

[22] Filed: Feb. 8, 1985

[51] Int. Cl.$^4$ ............................ C09K 7/02; C09K 7/06
[52] U.S. Cl. ............................... 252/8.514; 252/8.515; 252/8.551; 175/72
[58] Field of Search ............ 252/8.5 M, 8.5 P, 8.55 R

[56] References Cited

U.S. PATENT DOCUMENTS

| | | | |
|---|---|---|---|
| 3,168,475 | 2/1965 | Jordan et al. | 252/8.5 |
| 3,281,458 | 10/1966 | Jordan et al. | 260/501.15 |
| 3,379,650 | 4/1968 | Beasley et al. | 252/8.5 |
| 4,235,727 | 11/1980 | Firth | 252/8.5 |
| 4,311,600 | 1/1982 | Firth | 252/8.5 |

Primary Examiner—John F. Terapane
Assistant Examiner—Gary Geist
Attorney, Agent, or Firm—Edward J. Sites

[57] ABSTRACT

The disclosure is of particular substituted ammonium humates useful as fluid loss control agents in oil-based drilling fluids. The humate bears a unique compositional make-up.

4 Claims, No Drawings

SUBSTITUTED-AMMONIUM HUMATE FLUID LOSS CONTROL AGENTS FOR OIL-BASED DRILLING MUDS

BACKGROUND OF THE INVENTION

1. Field of the Invention

The invention relates to methods and compositions for controlling fluid loss in drilling fluids in which oil is the continuous phase and more particularly relates to the use of substituted-ammonium humates to control the fluid loss.

2. Brief Description of the Prior Art

Drilling fluids in which oil is the continuous phase are used for drilling oil wells which cannot be effectively drilled with water-based drilling fluids, because of such problems as the sloughing of clays, gelation at high temperatures, and the effects of contamination (by salt, gypsum, cement) resulting in high-viscosity, gelation and high fluid loss. The nature of emulsion muds and their use to minimize these problems have been described by Simpson, et al. (J. Pet. Tech., Dec. 1961, page 1177).

Invert emulsion drilling fluids result from the blending of an oil (typically diesel oil) with water in the presence of a suitable emulsifier. Oleophilic clays are used in these drilling fluids for increased stability, reduced water wetting, development of gel strength and reduced fluid loss. Additional fluid loss control is desirable and can be obtained by the use of organic filtration control additives (Simpson et al., supra.).

A known organic filtration control additive for oil muds consists of quaternary ammonium leonardites made by reaction of leonardite (or "lignite") with long chain quaternary alkylammonium compounds (Gray et al., composition and properties of oil well drilling fluids, 4th Edition, Gulf Pub. Co., Houston, Texas, (1980) page 66). Such agents are also described in U.S. Pat. Nos. 3,168,475 and 3,281,458.

Heretofore, a wide variety of drilling fluid additives have been proposed for oil muds. Included in the list of such additives are humates, lignitic materials and a wide variety of derivatives. Representative of such additives are those described in, for example, U.S. Pat. Nos. 3,168,475; 3,281,458; 3,379,650; 3,494,865; 3,775,447; 4,235,727; 4,311,600; and 4,421,655. In spite of the wide variety of drilling mud additives, a need has remained for additives which will improve fluid loss control.

We have now found that substituted-ammonium humates prepared from a particular humate material are exceptionally effective additives for fluid loss control in oil muds.

SUMMARY OF THE INVENTION

The invention comprises a fluid loss control agent useful as an ingredient in a drilling fluid composition having oil as the continuous phase, which comprises; the product obtained upon reaction of a humate which has been obtained by separation from association with a titanium mineral deposit, and a substituted-ammonium compound having at least one organic radical substituent providing oil dispersability to the reaction product.

The invention also comprises the use of the fluid loss control agent of the invention as an oil mud additive and the oil mud compositions thereof. The terms "drilling fluid", "oil mud" and "drilling muds" or simply "muds" as used herein refer to dispersions of solids, employed to facilitate the rotary drilling bores or wells in the earth.

The invention is particularly advantageous for improving oil-based drilling fluids or "oil muds".

The term "humate" as used throughout the specification and claims refers to the products of natural flocculation or precipitation in sand deposits, or humic substances that were derived form natural leaching of decaying plant and animal material (humus). The humate employed in the method and compositions of the invention are generally found in association with titanium mineral deposits and contain humic substances which may be the active ingredients in the control of fluid loss in drilling muds.

The phrase "humate in association with titanium mineral deposits" as used throughout the specification and claims means a humate, initially found in association with titanium mineral deposits and at least partially separated therefrom for use in the method of the present invention. Titanium mineral deposits include for example, rutile and/or ilmenite sand deposits.

The term "humic acid" has been widely applied to acidic solids obtained from plant decompositions. More recently, humic acids have been regarded as the intermediate product or products which result in the conversion of lignin and other plant materials to hard coal. It is believed that in the decomposition of vegetable matter, that the portion of the cell wall material consisting largely of lignin is converted into humus. In time, the humus may be converted progressively to peat, brown coal, bituminous coal and finally into anthracite. More usually, "humic substance" is applied as a generic term for the organic acids derived from humus or the top layer of the soil, containing organic decomposition products of vegetation and animal organisms in admixture with inorganic compounds, sand, minerals, metal hydroxide bases etc. The chemical structure of the humic acids has not been established, but they are believed to be large condensed ring, polymer like molecules containing carboxylic and phenolic groups. Depending on their solubilities, humic substances are usually classified as humic acid, fulvic acid, hymatomelanic acid or humin.

The terms "lignin" and "lignite" are used in the art, sometimes interchangeably with the term "leonardite". The latter term refers to a coal-like substance which is similar, but not identical in structure and composition to lignite. Leonardite has been considered to be a naturally oxidized lignite. In fact, leonardite is a specific organic material named after A. G. Leonard who was associated with its identification. Leonardite is primarily mined from the Harmon bed in Bowman County, and Divide County in North Dakota and in and around Alpine, Texas. The significant elemental difference between leonardite and lignite is its oxygen content. Leonardite has an oxygen content on the order of 28 to 29%, whereas lignite has a much lower oxygen content of from 19 to 20%, on an ash and moisture free basis. Unfortunately, in common use leonardite has been often times called a lignite. Thus, those skilled in the drilling arts often describe a viscosity lowering additive as "lignin", "mined lignin" or "lignite" when they actually mean the preferred additive "leonardite". Leonardite is preferred as a viscosity reducing agent in certain drilling muds as opposed to lignite, because of its higher oxygen content and the functional advantages which are apparently related to the higher oxygen content. Leonardite is compositionally most analogous to the base humate material employed in the method and compositions of the present invention. Accordingly, comparative studies, as herein presented, were made against leonardite derivatives to determine the previously described advantages of the invention.

DETAILED DESCRIPTION OF THE INVENTION

The oil which forms a continuous phase of oil mud is a petroleum oil, and most generally is an ordinary diesel oil, although it may be rather lighter, such as kerosene, or somewhat heavier, such as fuel oil, white oils, or crude oil. In some cases the sole constituents of the oil mud may be simply a petroleum oil. Recently, because of environmental considerations, special oils of low toxicity are being used as the oil phase. Examples of these special oils are the paraffinic, naphthenic oil called Conoco ODC TM drilling fluid base and another oil called Mentor 28 ®.

Frequently, the mud will contain other additives, a common one being water, often present from as little as 2% or 3% by volume to as great as 40% to 60% by volume. It is desirable and common to use a suitable emulsifying agent, which may be the calcium salt of an inexpensive fatty acid, e.g., calcium tallate, to emulsify the water in the oil.

The presence of water in the mud serves to increase the density of the fluid somewhat since the water is heavier than the oil used; and it also helps to reduce filtration. Also it lowers the cost of the well-working fluid which is often an important item when large volumes are used. Often water soluble salts such as calcium chloride are added to the aqueous phase.

Weighting materials are routinely used in muds where needed, such as ground barite, calcium carbonate, siderite, iron oxide, ilmenite and the like. Suspending agents and viscosifiers such as organophilic clays, asphalt and the like are commonly employed. Moreover, the fluids may contain various oil soluble or dispersible materials which function to keep the solids in the mud from being wet with water.

Dispersants for organophilic polyphenolic compounds, such as those disclosed in U.S. Pat. No. 3,379,650 and U.S. Pat. No. 3,425,953, may be added to the mud.

The fluid loss of any of the well known oil-based drilling muds may be improved by the method of the invention. By "fluid loss" I mean that in use, the fluid part of the mud tends to separate and migrate into the earth structure.

The humate compositions employed to prepare the additives of the invention are naturally occurring compositions of matter found in association with titanium mineral deposits such as rutile and/or ilmenite sand deposits. Such heavy mineral sands are found in several places throughout the world. In the United States titanium mineral sand deposits are located in Florida, Georgia and South Carolina in a formation commonly referred to as "hard pan". The hard pan comprises rutile and/or ilmenite sands bound together by a coating of humate. It is this humate which is employed in the present invention.

The desired humate may be separated from the titanium mineral sand deposits by first breaking up the deposit formation of hard pan into a ground or of a convenient size for handling. Much of the humate in the ground ore can be washed off with water to effect the desired separation. Additional humate can be obtained by washing the concentrated ore with aqueous sodium hydroxide. The aqueous mixture containing the free humates may then be treated with, for example, a strong mineral acid such as sulfuric acid or alum to regain the natural pH of the humate and facilitate settling out of the suspended humate. The separated humate may then be dried in the sunlight or by artificial means. The separated humate is unique, compositionally, and differs significantly from leonardite in compositional make-up. For comparative purposes, the following Tables 1-3 shown the elemental composition, functional group content and metal content of a humate composition separated from such a rutile and/or ilmenite sand deposit, in comparison to four commercially available leonardites.

TABLE 1
COMPOSITION

| | Elemental Composition (Dry Basis) (%) | | | | "As Is" Moisture (%) | Ash Content, Wt. % | |
|---|---|---|---|---|---|---|---|
| | C | H | O | S | | Ash (As is) | (Dry Basis) |
| Rutile and/or Ilmenite Sand Humate | 38.01 | 2.38 | 25.29 | 0.58 | 3.90 | 32.85 | 34.18 |
| Commerical Leonardite A | 50.61 | 2.80 | 19.83 | 1.15 | 15.50 | 16.87 | 19.96 |
| Commerical Leonardite B | 55.42 | 2.82 | 23.15 | 1.34 | 14.81 | 15.86 | 18.61 |
| Commerical Leonardite C | 54.17 | 2.84 | 21.86 | 1.60 | 13.56 | 17.00 | 19.67 |
| Commerical Leonardite D | 52.81 | 2.94 | 23.43 | 1.47 | 13.19 | 19.06 | 21.96 |

TABLE 2
FUNCTIONAL GROUP CONTENT* AND C:H AND C:O RATIOS

| | Functional Group Contents (Dry Basis) meg/g | | Ratios, Wt./Wt. (Dry Basis) | |
|---|---|---|---|---|
| | Total Acidity | Carboxylic Acid | C:H | C:O |
| Rutile and/or Ilmenite Sand Humate | 6.1 | 2.2 | 16.0:1 | 1.5:1 |
| Commerical Leonardite A | 5.3 | 1.8 | 18.1:1 | 2.6:1 |
| Commerical Leonardite B | 6.0 | 1.8 | 19.6:1 | 2.4:1 |
| Commerical Leonardite C | 5.2 | 1.5 | 19.1:1 | 2.5:1 |
| Commerical Leonardite D | 5.1 | 1.5 | 18.0:1 | 2.2:1 |

*Methods for the functional group analysis may be found in M. Schnitzer and S. U. Kahn, "Humic Substances in the Environment," Marcel Dekker, Inc., New York, New York, 1972, pp. 39–41. The barium hydroxide method for total acidity and calcium acetate method for carboxylic acid groups described in the citation were used.

TABLE 3
METAL CONTENT

| | Metal Contents (Dry Basis) (%) | | | |
|---|---|---|---|---|
| | Al | Ti | Fe | Ca |
| Rutile and/or Ilmenite Sand Humate | 5.6 | 0.85 | 0.9 | 0.06 |
| Commerical Leonardite A | 0.8 | 0.06 | 1.1 | 2.4 |
| Commerical Leonardite B | 0.9 | 0.04 | 1.6 | 2.6 |
| Commerical Leonardite C | 0.8 | 0.05 | 1.6 | 2.4 |
| Commerical | 0.9 | 0.06 | 1.8 | 2.7 |

TABLE 3-continued
METAL CONTENT

| | Metal Contents (Dry Basis) (%) | | | |
|---|---|---|---|---|
| | Al | Ti | Fe | Ca |
| Leonardite D | | | | |

Other titanium mineral deposits from which associated humate may be separated and used in the method of the invention are found extensively in the United States in such areas as the Adirondack mountains of New York State, California, Wyoming, Minnesota and Rhode Island. A principal deposit is located at Trail Ridge, Fla. The humate is separated from these deposits in a manner similar to that previously described. For comparative purposes, the following Table 4 shows the elemental composition and metal content of humate composition separated from such a deposit at Trail Ridge, Fla.

TABLE 4

| Element | Composition (%) (Dry Basis) |
|---|---|
| C | 45.21 |
| H | 3.25 |
| O | 23.75 |
| S | 0.30 |
| ash | 23.99 |
| Ti | 0.61 |
| Zr | 0.014 |
| Al | 5.34 |
| Fe | 0.46 |
| Ca | 0.007 |
| C/O ratio | 1.9:1.0 |
| C/H ratio | 13.9:1.0 |

It will be appreciated that the above analysis is for specific materials and the compositional make-up may vary somewhat for different materials within the same ore body. In general the humate compositions employed in preparing additives of the invention have compositional make-ups which provide a carbon to hydrogen ratio (weight to weight) of from 9.5–17.5:1.0; a carbon to oxygen ratio of 1.0–3:1.0; an aluminum content of 2.8 to 8.4 percent by weight, a titanium content of 0.5 to 3.5 percent by weight and a calcium content of less than 0.5 percent by weight.

It will be appreciated from the above comparison that the humate associated with titanium mineral deposits bears some resemblance in compositional make-up to leonardite. However, it contains substantially larger proportions of some metals, particularly aluminum and titanium, as well as lower C/H and C/O ratios. There is also a lower calcium content. Although applicant does not wish to be bound by any theory of operation, it is believed that these compositional differences over leonardite account for the functional advantages associated with the compositions of the present invention, in comparison to leonardite derivatives as a drilling mud additive. The relatively high content of aluminum and titanium suggest that the chemical make-up of the humate employed in the method of the invention may include organotitanium and organoaluminum compounds which exert some beneficial effect when present in oil muds.

In addition, the relatively low C/H and C/O ratios of humate compared to the leonardite indicate the presence of relatively more highly oxygenated compounds in humate.

The substituted-amine compounds employed to prepare the substituted ammonium additive agents of the invention may be represented by those of the formula:

$$R_1R_2R_3N \tag{I}$$

wherein $R_1$, $R_2$ and $R_3$ are independently selected from the group consisting of hydrogen and alkyl, provided that at least one of $R_1$, $R_2$ and $R_3$ is alkyl of 12 to 22 carbon atoms, inclusive. Representative of such substituted-amine compounds are stearylamine, palmitylamine myristylamine, laurylamine, distearylamine, (trihydrogenated tallow) amine and the like.

Preferred substituted ammonium compounds used to prepare the additive agents of the invention are quaternary ammonium salts of the formula:

$$R_1R_2R_3R_4N^+X^- \tag{II}$$

wherein $R_2$, $R_3$ and $R_4$ are selected from the group consisting of alkyl and aralkyl; X represents the anion such as chloride, bromide, sulfate and the like, and $R_1$, alkyl of 12 to 22 carbon atoms, inclusive. Representative of quaternary ammonium compounds of the formula (II) are tri(hydrogenated-tallow)methylammonium chloride, di(hydrogenated-tallow)dimethylammonium chloride, distearyldimethylammonium chloride, dimethyldicocoammonium chloride, distearyldimethylammonium chloride, ditallow dimethylammonium chloride, dipalmityldimethylammonium chloride, dimyristyldimethylammonium chloride, dilauryldimethylammonium chloride, stearyltrimethylammonium chloride, palmityltrimethylammonium chloride, cetyltrimethylammonium chloride, myristyltrimethyl ammonium chloride, lauryltrimethylammonium chloride, dimethyl(hydrogenated-tallow) benzylammonium chloride, methyldi(hydrogenated-tallow) benzylammonium chloride and the like.

The product of the reaction of the particular humate and the substituted amine or quaternary ammonium compound employed to prepare the additive agent of the invention is an oil dispersable humate derivative. Most preferred as the additive agent of the invention is the dimethyldi(hydrogenated tallow) ammonium humate, wherein the humate portion is provided by the humate described above.

The substituted-ammonium humates, except for the quaternary ammonium humates, are prepared by reaction of the free amine with a suspension of humate. Optionally, calcium hydroxide can be added to form mixed alkylammonium calcium humates of the general type described by Cowan, U.S. Pat. No. 4,421,655.

The quaternary ammonium humates employed in the method of the invention are prepared by reaction of the corresponding quaternary salt, such as the chloride, with the abovedescribed titanium associated humates. Preferably, the humate is first converted to the sodium salt thereof by treatment with sodium hydroxide. The solution of sodium humate is then mixed with a solution of the quaternary ammonium salt equal in equivalents to the sodium hydroxide. The final pH is adjusted, if necessary by addition of acid or alkali, and the complete product may then be dried.

The proportion of amine or quaternary ammonium halide used to react with the humate to prepare the additive compounds of the invention may be within the range of from 1–5 meq/gm of humate, preferably 2–4 meq/g.

The method of the invention is carried out by providing the above described substituted-ammonium humates as drilling mud additives and dispersing a fluid loss reducing proportion of the additive in an oil mud. Dispersion may be carried out employing conventional mixing and agitating equipment, for dispersing like additives in drilling mud compositions.

It will be appreciated by those skilled in the art that specific proportions employed may depend upon conditions encountered in the drilling of the well and may be varied. For example, as the drilling of the bore or well progresses and becomes deeper, temperatures in the well will increase, requiring different proportions of additive. Clearly, a specific proportion of additive may be varied depending upon the drilling conditions. It can be stated however that normally the proportion will be within the range of from about 0.25 to about 25, preferably 1 to about 15, and most preferably 1 to about 10 lbs. per barrel of drilling mud. The term "barrel" as used herein refers to a barrel of 42 standard U.S. gallons.

The following preparations and examples describe the manner and process of making and using the invention and set forth the best mode contemplated by the inventor for carrying out the invention but are not to be construed as limiting. The physical test data presented was obtained using procedures specified by API (American Petroleum Institute) RP 13B, "Standard Procedure for Testing Drilling Fluids", and Appendix A, API RP 29, 4th EDN, "Suggested Procedures for Laboratory Evaluation of Drilling Mud Materials".

A Fann viscometer (Model No. 35A) was used to determine the yield point, shear strength and 10-minute gel strengths. Commercially available drilling mud testing equipment was used for the A.P.I. filtrate and high temperature/high pressure filtrate (HPHT) determinations. The amounts of additive used in the examples are on a moisture free basis.

PREPARATION NO. 1

Base Mud I

For each barrel equivalent of mud desired an appropriate vessel is charged with 236 ml. of No. 2 diesel oil, 3 gm of lime hydrate and 5 ml of EZ MUL ® emulsifier (Baroid Co.). The charge is stirred for 5 minutes and then 60 ml of 30% by weight calcium chloride (brine) is added with continued stirring for 10 minutes. At the end of the period, 5 gm of Geltone II ® (Baroid Co.) is added with stirring continued for 20 minutes, after which 235 gms of barite is added with stirring continued for an additional 10 minutes. The resulting base mud is hot-rolled for 16 hours at a temperature of 150° F. and then stirred with a dispersator for 10 minutes. The mud is then sealed until used, preceded by hand-stirring with a spatula.

PREPARATION NO. 2

BASE MUD II

The procedure of Preparation 1 is followed except that the amount of lime hydrate is increased to 6 g, the amount of EZ MUL ® emulsifier is decreased to 5 ml, and the amount of Geltone II ® is increased to 5.5 g.

PREPARATION 3

To an appropriate vessel there is charged a suspension of 236.3 g of humate (50.0 g, O.D.) obtained from the titanium mineral sand deposits in the vicinity of Green Cove Springs, Florida, and having the composition of the rutile and/or ilmenite sand humate shown in Tables 1-3, supra. The charge is stirred under a blanket of nitrogen gas for one hour, after adding 0.5 gm/ml of sodium hydroxide solution (14.0 ml, 175 meq). At the end of this period of stirring, 131.9 gms of dimethyldi(hydrogenated-tallow)ammonium chloride (75% active in isopropanol water diluted with 40 ml of deionized water) is added over a period of 10 minutes, rinsed into the reactor with 10 ml additional water and stirring is continued for an additional one hour. The pH of the mixture is adjusted to 7.6–8.6 and the entire product is freeze dried. The product of dimethyldi(hydrogenated-tallow) ammonium humate was subjected to elemental analysis. The analysis, compared to that of a commercially available quaternary ammonium leonardite is shown in Table 5, below. The product is mostly soluble in #2 fuel oil, tetrahydrofuran and benzene; partly soluble in n-hexane, methylene chloride, methanol, dimethylformamide and water.

PREPARATION 4

The procedure of Preparation 2, supra., is repeated, except that in place of the dimethyldi(hydrogenated-tallow)ammonium chloride as used therein, a molar equivalent amount of dimethyldicocoammonium chloride (104.5 g, 75% active in isopropanol) was used to obtain the corresponding humate. The product elemental analyses are given in Table 5 below. The product is mostly soluble in methanol and tetrahydrofuran and partly soluble in n-hexane, benzene, and #2 fuel oil.

TABLE 5

ELEMENTAL COMPOSITIONS OF QUATERNARY AMMONIUM HUMATES

| Product | Composition (Moisture Free), % | | | | | Moisture % |
|---|---|---|---|---|---|---|
| | Ash | C | H | O[a] | N | |
| Commercial Quaternary Ammonium Leonardite | 17.06 | 61.62 | 7.31 | 11.97 | 2.44 | 5.86 |
| Prep. 3 | 11.70 | 62.55 | 9.72 | 14.14 | 1.89 | 3.14 |
| Prep. 4 | 14.54 | 59.62 | 9.03 | 14.55 | 2.26 | 4.41 |

[a]By difference.

PREPARATION NOS. 5–9

Several preparations are carried out to prepare dimethyldi(hydrogenated-tallow)ammonium humates using various amounts of the quaternary salt or an adjusted pH. The following general procedure is used with the details summarized in Table 6.

To a 1000-ml resin kettle is added humate suspension [ca. 20% solids, 50 (o.d.) g], and deionized water is added to dilute the solids to 10%. The required amount of sodium hydroxide (equivalent to the quaternary ammonium chloride) is added and the mixture is heated to 75° C. and held at 75° C. for about one hour. Then the initial pH is measured. In the meantime, the quaternary ammonium chloride (75% in isopropanol) is heated on a steam bath until the solid phase dissolves. The quaternary ammonium chloride is added to the stirred reaction mixture, and the reaction is allowed to continue for about one hour at 75° C. The final pH is measured and, if desired, adjusted with 10% sulfuric acid or 50% sodium hydroxide (as aqueous solutions).

TABLE 6

Preparation of Dimethyldi (hydrogenated-tallow) ammonium Humate

| Preparation No. | Variable Investigated | Quaternary Ammonium Chloride % (o.d.) on Humate (o.d.) | Meq/g Humate | pH Initial | pH Final | pH Adjusted |
|---|---|---|---|---|---|---|
| 5 | Baseline Run | 198 | 3.49 | 8.7 | 9.0 | — |
| 6 | Reduced Quat. Level | 57 | 1.00 | 6.5 | 6.0 | — |
| 7 | Intermediate Quat. Level | 114 | 2.01 | 6.7 | 6.8 | — |
| 8 | Increased Quat. Level | 280 | 4.94 | 10.4 | 10.4 | 8.4 |
| 9 | Intermediate Quat. Level, pH Adjustment | 114 | 2.01 | 6.7 | 6.8 | 10.0 |

PREPARATION NO. 10

To an appropriate vessel is charged 6.8 kg of a humate suspension in water (19% solids) obtained from the titanium mineral sand deposits in the vicinity of Green Cove Springs, Fla., and having the composition of the humate shown in Tables 1-3, supra. To this is added with stirring 360 g. of 50% caustic. The mixture is heated to about 80° C. To it is then added di(hydrogenated-tallow)ammonium chloride (75% active in isopropanol/water also preheated to about 80° C., and 1.3 kg of water. The mixture is stirred for several minutes more until it appears uniform in consistency. It is then spray dried.

PREPARATION NO. 11

The procedure of Preparation 10, supra., is repeated except that 11.811 kg of the humate suspension and 2kg of water are used.

PREPARATION NO. 12

A 10% by weight uniform suspension of humate (obtained from Green Cove Springs, supra.) is prepared by mixing 231.7 g (50.0 g o.d.) of a humate suspension and 268.3 g of deionized water in a Waring Blender. Then 87.62 g di(hydrogenated-tallow)amine (100% active 3.49 meq amine/g humate) is added and the mixture is mixed at high speed for 10 minutes. The entire product is freeze dried.

PREPARATION NO. 13

The procedure of Preparation 12 is followed except that the amount of the amine is reduced to 25.1 g (1.00 meq/g humate).

PREPARATION NO. 14

The procedure of Preparation 13 is followed except that after 5 minutes reaction with 25.1 g of the amine, 4.61 g of calcium hydroxide (2.49 meq/g humate) was added, and then the mixture was stirred for five more minutes.

EXAMPLE 1

A portion (350 ml) of the base mud prepared as above in Preparation 1, supra. is charged to each of four appropriate mixing vessels, identified by the symbols A through D. To vessel A there is no addition of any fluid loss control agent, the run to act as a control. To vessel B there is added the dimethyldi(hydrogenated tallow)ammonium humate of Preparation 3, supra., in a proportion of 2 PPB of mud. To vessel C there is added the dimethyldicocoammonium humate of Preparation 4, supra., in a proportion of 2 PPB of base mud. Vessel D receives a commercially available quaternary ammonium leonardite in a proportion of 2 PPB of base mud.

The base mud is stirred with the additives (when used) for 15 minutes with a Hamilton Beach Mixer at low speed. Each product is hot-rolled at a temperature of 150° F. for 16 hours. Rheology and electrical stability test measurements are made at 120° F. The tests and test results are given in the Table 7, below.

TABLE 7

| | VESSEL AND ADDITIVE | | | |
|---|---|---|---|---|
| | A CONTROL | B PREP. 3 | C PREP. 4 | D QUATERNARY AMMONIUM LEONARDITE |
| Plastic Viscosity (CPS) | 18 | 19 | 19 | 19 |
| Yield Point (LB/100 FT$^2$) | 12 | 16 | 13 | 11 |
| 10 SEC Gel (LB/100 F$^2$) | 6 | 8 | 7 | 6 |
| 10 Min. Gel (LB/100 FT$^2$) | 7 | 10 | 8 | 7 |
| Electric Stability (Volt) | 1080 | 1040 | 1020 | 1160 |
| Alkalinity (ml 0.1 N H$_2$SO$_4$) | 1.2 | 1.3 | 1.5 | 2.1 |
| API Fluid Loss (ml/30 MIN) | 3.4 | 2.2 | 2.6 | 3.4 |
| HTHP Fluid Loss (ml/30 MIN) 300° F. | 28.0 | 15.2 | 15.2 | 27.6 |
| Water in HTHP Filtrate (ml) | 4.4 | 3.0 | 2.0 | 5.2 |

EXAMPLE 2

The procedure of Example 1, supra., is repeated except that each additive is added at a proportion of 5 PPB of base mud. The test results are given in Table 8, below.

TABLE 8

| | VESSEL AND ADDITIVE | | | |
|---|---|---|---|---|
| | A CONTROL | B PREP. 3 | C PREP. 4 | D QUATERNARY AMMONIUM LEONARDITE |
| Plastic Viscosity (CPS) | 18 | 19 | 19 | 21 |
| Yield Point (LB/100 FT$^2$) | 12 | 15 | 13 | 11 |
| 10 SEC Gel (LB/100 FT$^2$) | 6 | 8 | 7 | 6 |
| 10 Min. Gel (LB/100 FT$^2$) | 7 | 9 | 8 | 7 |
| Electric Stability (Volt) | 1080 | 1180 | 880 | 1040 |
| Alkalinity (ml 0.1 N H$_2$SO$_4$) | 1.2 | 1.4 | 1.7 | 2.1 |
| API Fluid Loss (ml/30 MIN) | 3.4 | 3.4 | 2.0 | 3.0 |
| HTHP Fluid Loss (ml/30 MIN) 300° F. | 28.0 | 10.0 | 16.4 | 38.4 |
| Water in HTHP Filtrate (ml) | 4.4 | Trace | 3.2 | 5.6 |

EXAMPLE 3

The procedure of Example 1, supra., is repeated except the proportion of additive is increased to 10 PPB. The test results are given in Table 9, below.

TABLE 9

| | VESSEL AND ADDITIVE | | | |
|---|---|---|---|---|
| | A CONTROL | B PREP. 3 | C PREP. 4 | D QUATERNARY AMMONIUM LEONARDITE |
| Plastic Viscosity | 18 | 20 | 22 | 27 |
| Yield Point (LB/100 FT²) | 12 | 7 | 8 | 13 |
| 10 SEC Gel (LB/100 FT²) | 6 | 5 | 4 | 7 |
| 10 Min. Gel (LB/100 FT²) | 7 | 6 | 5 | 7 |
| Electric Stability (Volt) | 1080 | 1060 | 760 | 980 |
| Alkalinity (ml 0.1 N H₂SO₄) | 1.2 | 1.6 | 1.1 | 1.8 |
| API Fluid Loss (ml/30 MIN) | 3.4 | 3.2 | 3.0 | 4.6 |
| HTHP Fluid Loss (ml/30 MIN) 300° F. | 28.0 | 10.0 | 27.2 | 42.8 |
| Water in HTHP Filtrate (ml) | 4.4 | 0.0 | 4.0 | 6.0 |

EXAMPLE 4

The procedure of Example 3, supra., was repeated, except that after hot-rolling for 16 hours at a temperature of 150° F., the mixtures were static aged for an additional 16 hours at a temperature of 300° F. Then the mixtures were stirred for 5 minutes in a Hamilton Beach blender (low speed) and tested at a temperature of 120° F. The test properties observed are given in Table 10, below.

TABLE 10

| | VESSEL AND ADDITIVE | | | |
|---|---|---|---|---|
| | A CONTROL | B PREP. 3 | C PREP. 4 | D QUATERNARY AMMONIUM LEONARDITE |
| Plastic Viscosity (CPS) | 16 | 17 | 17 | 18 |
| Yield Point (LB/100 FT²) | 2 | 5 | 7 | 8 |
| 10 SEC Gel (LB/100 FT²) | 4 | 5 | 4 | 6 |
| 10 Min. Gel (LB/100 FT²) | 6 | 6 | 6 | 7 |
| Electric Stability (Volt) | 880 | 920 | 640 | 940 |
| Alkalinity (ml 0.1 N H₂SO₄) | 0.0 | 0.0 | 0.1 | 0.4 |
| API Fluid Loss (ml/30 MIN) | 5.4 | 4.8 | 2.6 | 7.8 |
| HTHP Fluid Loss (ml/30 MIN) 300° F. | 92.0 | 11.2 | 24.4 | 74.4 |
| Water in HTHP Filtrate (ml) | 11.6 | 4.8 | 4 | 10.4 |
| Static Shear (Lb/100 FT²) | 60 | 60 | 60 | 90 |
| Free Oil (in) | 2½ | 1¼ | 1¼ | 1½ |

EXAMPLE 5

The procedure of Example 4 was followed except that the base mud was from Preparation 2 and the dimethyldi(hydrogenated-tallow)ammonium humates were from Preparations 5, 6 and 7. The results in Table 11 show that the performance of the quaternary ammonium humates increased as the amount of the quaternary ammonium chloride increased from 57% to 114% and 198%. At the 57% level fluid loss control was not as good as obtained with the base mud alone. [However, under otherwise comparable conditions the 57% level reduced fluid loss from 21.0 ml for the base mud to 9.4 ml if the muds were hot-rolled for 16 hours at 150° F.].

TABLE 11

| | VESSEL AND ADDITIVE | | | |
|---|---|---|---|---|
| | A Prep. 6 57% Quat. | B Prep. 7 114% Quat. | C Prep. 5 198% Quat. | D Control (Base Mud) |
| Plastic Viscosity (CPS) | 21 | 20.5 | 17.5 | 15.0 |
| Yield Point (LB/100 FT²) | 19 | 10.5 | 6.5 | 12.0 |
| 10 SEC Gel (LB/100 FT²) | 12.0 | 7.0 | 4.5 | 6.5 |
| 10 Min. Gel | 14.0 | 8.0 | 5.0 | 8.0 |
| Electric Stability (Volt) | 1084 | 1008 | 856 | 836 |
| Alkalinity (ml 0.1 N H₂SO₄) | 0.15 | 0.24 | 0.49 | 1.22 |
| API Fluid Loss (ml/30 MIN) | 5.2 | 2.5 | — | 5.1 |
| HTHP Fluid Loss (ml/30 MIN) 300° F. | 48.2 | 28.6 | 19.9 | 32.0 |

EXAMPLE 6

The procedure of Example 5 is followed except the dimethyldi(hydrogenated-tallow)ammonium humates are from Preparations 5, 7 and 9 and are used at 5.0 PPB. The results (Table 12) show that 198% on humate gives better fluid loss control under these conditions than higher or lower proportions.

| | VESSEL AND ADDITIVE | | | |
|---|---|---|---|---|
| | A Prep. 7 114% Quat. | B Prep. 5 198% Quat. | C Prep. 8 280% Quat. | D Control (Base Mud) |
| Plastic Viscosity (CPS) | 19 | 17 | 18 | 15 |
| Yield Point (LB/100 FT²) | 20 | 11 | 17 | 10 |
| 10 SEC Gel (LB/100 FT²) | 10 | 7 | 8.5 | 5 |
| 10 Min. Gel (LB/100 FT²) | 12 | 7.5 | 10 | 6.5 |
| Electric Stability (Volt) | 994 | 874 | 910 | 848 |
| Alkalinity (ml 0.1 N H₂SO₄) | 0.80 | 0.5 | 0.54 | 0.88 |
| API Fluid Loss (ml/30 MIN) | 4.6 | 4.6 | 3.9 | 5.4 |
| HTHP Fluid Loss (ml/30 MIN) 300° F. | 50 | 27.6 | 38.0 | 38.0 |

EXAMPLE 7

This example compares spray-dried quaternary ammonium humates from Preparations 10 and 11 to a commercial quaternary ammonium leonardite in an oil mud where the fluid loss control agents are added during preparation of the mud. Each sample is prepared individually under the same stirring conditions.

Diesel oil (248 ml), E2 mud ® emulsifier (2 ml) and Invermul ® emulsifier (8 ml) are combined and stirred with a Hamilton Beach Multimixer while the following materials are added:

|  |  | Time of Entry |
|---|---|---|
| Calcium hydroxide | 4 g | 1 min. |
| Brine (30% by wt.) | 45 ml | 2 |
| Geltone II | 4 g | 15 |
| Fluid loss additive | 5 g | 25 |
| Barite | 236 g | 45 |

The total stirring time is 65 min. The samples are hot rolled for 16 hr. at 150° F. and then static aged at 300° F. before testing. Table 13 summarizes the test results. The quaternary ammonium humates from Preparation 10 and 11 are clearly better than the commercial quaternary ammonium leonardite at reducing fluid loss.

TABLE 13

|  | Vessel and Additive | | |
|---|---|---|---|
|  | A<br>Quat.<br>Ammonium<br>Leonardite | B<br>Prep. 11<br>(114% Quat.) | C<br>Prep. 10<br>(198% Quat.) |
| Plastic Viscosity (CPS) | 21 | 22 | 21 |
| Yield Point (Lb/100 FT$^2$) | — | — | 2 |
| 10 Sec Gel (Lb/100 FT$^2$) | 3 | 3 | 3 |
| 10 Min Gel (Lb/100 FT$^2$) | 4 | 5 | 5 |
| Electric Stability (volt) | 1240 | 1180 | 1360 |
| HTHP Fluid Loss (ml/30 MIN) 300° F. | 66 | 36 | 26 |

EXAMPLE 8

This example compares spray-dried quaternary ammonium humates from Preparations 10 and 11 to a commercial quaternary ammonium leonardite in an oil mud made from a paraffenic, naphthinic oil consisting of branched and cyclic aliphatic hydrocarbons (Vista ODC ™ Drilling Fluid Base Oil). Each sample is prepared individually under the same stirring conditions, and the fluid loss control agents are added during preparation of the mud.

The ODC ™ oil (224 ml) and EZ MUL ® emulsifier (7 ml) are combined and stirred with a Hamilton Beach Multimixer while the following materials are added:

|  |  | Time of Entry, Min. |
|---|---|---|
| Geltone II ® | 9 g | 5 |
| Calcium Hydroxide | 2 g | 6 |
| Calcium Chloride Brine (30% by weight) | 45.5 | 30 |
| Fluid loss additive | 5 g | 35 |
| Rev. Dust | 164 g | 45 |
| Barite (Weighing agent) | 236 g | 55 |

The total stirring time is 75 min. The samples are then hot-rolled for 16 hours at 150° F. followed by 16 hours of rolling at 300° F.

Tests of the samples give the results shown in Table 14.

TABLE 14

|  | Vessel and Additive | | |
|---|---|---|---|
|  | A<br>Quat. Ammon.<br>Leonardite | B<br>Prep. 12<br>(114% Quat) | C<br>Prep. 11<br>(198% Quat) |
| Plastic Viscosity (CPS) | 38 | 68 | 68 |
| Yield Point (LB/100 FT$^2$) | 4 | 37 | 26 |
| 10 SEC Gel (LB/100 FT$^2$) | 4 | 22 | 42 |
| 10 Min. Gel (LB/100 FT$^2$) | 6 | 46 | 6 |
| Electric Stability (Volt) | 240 | 320 | 410 |
| HTHP Fluid Loss (ml/30 min) 300° F. | 96 | 60 | 74 |

Compared to the quaternary ammonium leonardite the quaternary ammonium humates reduce fluid loss, substantially.

EXAMPLE 9

This example shows the effects of di(hydrogenated-tallow)ammonium humates, and a di(hydrogenated-tallow)ammonium calcium humate on an oil drilling mud. The procedure of Example 5 is followed with the additives from Preparations 12, 13 and 14 and the results are shown in Table 15. Some fluid loss control can be obtained with these substituted-ammonium humates and substituted-ammonium calcium humates. The latter gives better fluid control than the corresponding substituted-ammonium humate.

TABLE 15

|  | VESSEL AND ADDITIVE | | | |
|---|---|---|---|---|
|  | A<br>Control<br>(Base Mud) | B<br>Prep. 12<br>3.49 meg.<br>Amine/g<br>Humate | C<br>Prep. 13<br>1.00 meg.<br>Amine/g<br>Humate | D<br>Prep. 14<br>1.00 meq<br>Amine/g Humate +<br>2.49 meq Ca$^{++}$/g Humate |
| Plastic Viscosity (CPS) | 14 | 15 | 18 | 16 |
| Yield Point (LB/100 FT$^2$) | 11 | 13 | 9 | 13 |
| 10 SEC Gel (LB/100 FT$^2$) | 6 | 8 | 8 | 8 |
| 10 Min. Gel (LB/100 FT$^2$) | 7 | 9 | 10 | 9 |
| Electric Stability (Volts) | 852 | 948 | 980 | 916 |
| Alkalinity (ml 0.1 N H$_2$SO$_4$) | .72 | .34 | .22 | .33 |
| API Fluid Loss (ml/30 MIN) | 5.3 | 6.6 | 7.8 | 6.7 |

TABLE 15-continued

| | VESSEL AND ADDITIVE | | | |
|---|---|---|---|---|
| | A<br>Control<br>(Base Mud) | B<br>Prep. 12<br>3.49 meg.<br>Amine/g<br>Humate | C<br>Prep. 13<br>1.00 meg.<br>Amine/g<br>Humate | D<br>Prep. 14<br>1.00 meq<br>Amine/g Humate +<br>2.49 meq Ca$^{++}$/g Humate |
| HTHP Fluid Loss<br>(ml/30 MIN)<br>300° F. | 49.0 | 46.0 | 59.0 | 40.0 |

What is claimed is:

1. In a drilling fluid composition having oil as the continuous phase, the improvement which comprises the presence of a fluid loss-reducing proportion of a quaternary ammonium humate, said humate having been separated from association with titanium mineral deposits, and having a compositional make-up of carbon and hydrogen in a weight to weight ratio of 9.5-17.5:1.0; oxygen in a carbon to oxygen ratio of 1.0-2.3:1.0 (weight to weight); aluminum (2.8-8.4 percent by weight); titanium (0.5 to 3.5 percent by weight); and less than 0.5 percent by weight of calcium, said ammonium group being dimethyldicocoammonium, said quaternary ammonium humate being oil-dispersable.

2. In a drilling fluid composition having oil as the continuous phase, the improvement which comprises the presence of a fluid loss-reducing proportion of a quaternary ammonium humate, said humate having been separated from association with titanium mineral deposits, and having a compositional make-up of carbon and hydrogen in a weight to weight ratio of 9.5-17.5:1.0; oxygen in a carbon to oxygen ratio of 1.0-2.3:1.0 weight to weight); aluminum (2.8-8.4 percent by weight); titanium (0.5 to 3.5 percent by weight); and less than 0.5 percent by weight of calcium, said ammonium group being dimethyldi(hydrogenated tallow)ammonium, said quaternary ammonium humate being oil-dispersable.

3. A method of reducing the fluid loss of a drilling mud having oil as the continuous phase which comprises; providing a quantity of an additive composition comprised of a quaternary ammonium humate, said humate having been separated from association with titanium mineral deposits and the humate has a compositional make-up of carbon and hydrogen with a ratio (weight to weight) of 9.5-17.5:1.0; oxygen with carbon to oxygen (weight to weight) ratio of 1.0-2.3:1.0; an aluminum content of 2.8-8.4 percent by weight; a titanium content of 0.5-3.5 percent by weight and a calcium content of less than 0.5 percent by weight, said ammonium group being dimethyldicocoammonium, said quaternary ammonium humate being oil-dispersable; and dispersing a fluid loss-reducing proportion of the additive composition in the drilling mud.

4. A method of reducing the fluid loss of a drilling mud having oil as the continuous phase which comprises; providing a quantity of an additive composition comprised of a quaternary ammonium humate, said humate having been separated from association with titanium mineral deposits and the humate has a compositional make-up of carbon and hydrogen with a ratio (weight to weight) of 9.5-17.5:1.0; oxygen with carbon to oxygen (weight to weight) ratio of 1.0-2.3:1.0; an aluminum content of 2.8-8.4 percent by weight; a titanium content of 0.5-3.5 percent by weight and a calcium content of less than 0.5 percent by weight, said ammonium group being dimethyldi(hydrogenated tallow)ammonium, said quaternary ammonium humate salt being oil-dispersable; and dispersing a fluid loss-reducing proportion of the additive composition in the drilling mud.

* * * * *